United States Patent [19]

Webb et al.

[11] Patent Number: 5,026,890

[45] Date of Patent: Jun. 25, 1991

[54] METHOD AND INTERMEDIATES FOR PREPARATION OF BIS(AMINOALKYL)POLYDIORGANOSILOXANES

[75] Inventors: Jimmy L. Webb, Ballston Lake, N.Y.; Hans V. Ritschard, Pasadena, Calif.; James M. Lambert, Clifton Park, N.Y.

[73] Assignee: General Electric Company, Schenectady, N.Y.

[21] Appl. No.: 344,713

[22] Filed: Apr. 28, 1989

Related U.S. Application Data

[63] Continuation-in-part of Ser. No. 196,910, May 20, 1988, abandoned.

[51] Int. Cl.$^5$ .............................. C07F 7/08; C07F 7/10; C07F 7/18
[52] U.S. Cl. .................................... 556/408; 556/410; 556/425
[58] Field of Search ........................ 556/408, 410, 425

[56] References Cited

U.S. PATENT DOCUMENTS

| | | | |
|---|---|---|---|
| 2,567,131 | 9/1951 | Speier | 556/408 |
| 3,033,815 | 5/1962 | Pike et al. | 556/425 X |
| 3,044,982 | 7/1962 | Jex et al. | 556/425 X |
| 3,239,550 | 3/1966 | Murray | 556/408 |
| 3,243,404 | 3/1966 | Martellock | 556/410 X |
| 3,775,452 | 11/1973 | Karstedt | 556/425 X |
| 3,803,196 | 4/1974 | Holub et al. | 556/425 |
| 3,814,730 | 6/1974 | Karstedt | 556/410 X |
| 4,374,130 | 2/1983 | Barcza | 556/408 X |
| 4,471,132 | 9/1984 | Hallgren | 556/410 |
| 4,558,146 | 12/1985 | Kanner et al. | 556/410 |
| 4,584,393 | 4/1986 | Webb et al. | 556/425 X |
| 4,631,346 | 12/1986 | Webb et al. | 556/425 X |
| 4,649,208 | 3/1987 | Zenbayashi et al. | 556/410 X |
| 4,868,320 | 9/1989 | Meier et al. | 556/408 |

FOREIGN PATENT DOCUMENTS

| | | | |
|---|---|---|---|
| 2408480 | 9/1975 | Fed. Rep. of Germany | 556/410 X |
| 62-111991 | 5/1987 | Japan | 556/410 X |

*Primary Examiner*—Paul F. Shaver
*Attorney, Agent, or Firm*—William H. Pittman; James C. Davis, Jr.

[57] ABSTRACT

Silicon-nitrogen compounds are prepared by the reaction of an olefinic amine such as allylamine with a polydiorganosiloxane such as 1,1,3,3-tetramethyldisiloxane, in the presence of a platinum-containing hydrosilation catalyst, preferably a specifically defined platinum complex of 1,3,5,7-tetravinyl-1,3,5,7-tetramethylcyclotetrasiloxane. Depending on the reaction conditions, the product may be any of several compounds including bis(aminoalkyl)polydiorganosiloxanes and alkenylaminodisiloxanes which are spontaneously converted to cyclic disiloxazanes. The cyclic disiloxazanes may in turn be converted by hydrolysis to bis(aminoalkyl)octaorganotetrasiloxanes.

29 Claims, No Drawings

METHOD AND INTERMEDIATES FOR PREPARATION OF BIS(AMINOALKYL)POLYDIORGANOSILOXANES

This application is a continuation-in-part of copending application Ser. No. 196,910, filed May 20, 1988, now abandoned.

This invention relates to the preparation of bis(aminoalkyl)polydiorganosiloxanes and intermediates convertible thereto.

Bis(aminoalkyl)polydiorganosiloxanes are useful in many applications including the preparation of polyimides, especially polysiloxane polyetherimides such as those prepared by reaction of diamines with such anhydrides as 2,2-bis[4-(3,4-dicarboxyphenoxy)phenyl]propane dianhydride ("bisphenol A dianhydride"). Particularly valuable bis(aminoalkyl)polydiorganosiloxanes used for this purpose are 1,9-diamino-4,4,6,6-tetramethyl-5-oxa-4,6-disilanonane, also known as bis(3-aminopropyl)tetramethyldisiloxane and bis(γ-aminopropyl)tetramethyldisiloxane, and higher polydiorganosiloxane analogs thereof.

Commercial utilization of these compounds has been inhibited by the lack of convenient methods for their preparation on a large scale. Recently, several more suitable methods have been developed for such preparation.

U.S. Pat. No. 4,584,393, for example, describes a method for the preparation of bis(aminoalkyl)disiloxanes from acyclic olefinic silazanes by hydrosilation followed by hydrolysis. The process, however, includes numerous steps and is therefore somewhat inconvenient. U.S. Pat. No. 4,631,346 describes a method for preparing the same compounds by hydrosilation-hydrolysis of a silyl carbamate formed from allylamine, dimethylchlorosilane and carbon dioxide. This process also requires many steps, including one relatively inconvenient gas addition step or the equivalent thereof.

According to U.S. Pat. No. 4,649,208, organosilicon compounds containing amino groups are prepared by hydrosilation of an allylamine with a compound containing an Si—H bond, in the presence of a platinum-olefin complex and an amino compound other than the allylamine. However, when applied to the preparation of bis(aminoalkyl)polydiorganosiloxanes this method produces only low yields.

Therefore, by reason of the complexity and other deficiencies of the previously developed processes there still exists a demand for a simplified process for preparing bis(aminoalkyl)polydiorganosiloxanes. This demand is fulfilled in many respects by the present invention, which includes, in addition to said process, various intermediates prepared thereby.

In one of its aspects, the present invention is a method for preparing a silicon-nitrogen compound which comprises effecting reaction between the components of a mixture comprising (A) at least one olefinic amine of the formula

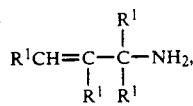

(I)

wherein each $R^1$ is independently hydrogen, $C_{1-4}$ primary or secondary alkyl, phenyl or substituted phenyl, and (B) at least one polydiorganosiloxane of the formula

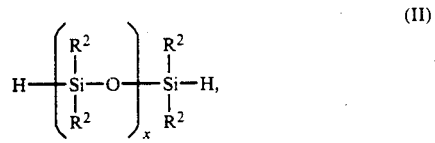

(II)

wherein $R^2$ is $C_{1-4}$ primary or secondary alkyl, phenyl or substituted phenyl and x has an average value from 1 to about 300, in the presence of a Catalytic amount of (C) a platinum-containing hydrosilation catalyst; said mixture containing titratable acid, if any, in an amount up to 0.5 equivalent per gram-atom of platinum.

Reagent A in the method of this invention is at least one olefinic amine of formula I. Suitable amines include allylamine (which is preferred), methallylamine and 2-butenylamine.

Reagent B is at least one polydiorganosiloxane of formula II. The 1,1,3,3-tetraalkyldisiloxanes, and especially 1,1,3,3-tetramethyldisiloxane (hereinafter "TMDS"), are often preferred. It is, however, frequently also advantageous to use higher siloxanes, up to an average molecular weight in the range of 15,000–20,000.

The reaction between the olefinic amine and the polydiorganosiloxane takes place in the presence of a platinum-containing hydrosilation catalyst. Many such catalysts are known in the art, and any of them may be employed in the present invention. They include platinum black, platinum on various supports such as silica, chloroplatinic acid, chloroplatinic acid-olefin complexes, and platinum complexes with olefins including olefinic polysiloxanes.

An especially useful class of platinum-containing catalysts consists of the complexes of vinyl-substituted polydiorganosiloxanes, particularly cyclic siloxanes and most particularly cyclotetrasiloxanes. In particular, complexes of 1,3,5,7-tetravinyl-1,3,5,7-tetramethylcyclotetrasiloxane are advantageous since they frequently provide the desired products in especially high yields.

In many embodiments of the invention, it is highly preferred that the catalyst contain a low proportion of halogen. Catalysts with this property have been found to be uniquely tolerant of the conditions under which the reaction is conducted, especially the presence of excess olefinic amine. In general, therefore, the most preferred catalysts contain halogen, if any, in an amount no greater than 1 gramatom per gram-atom of platinum. The most desirable halogen amount, particularly in the first and third embodiments of the invention described hereinafter, is less than about 0.1 gram-atom per gram-atom of platinum. The preparation of catalysts of this type containing low proportions of halogen, if any, is disclosed in U.S. Pat. Nos. 3,775,452 and 3,814,730, the disclosures of which are incorporated by reference herein.

Another important characteristic of the catalyst, as well as the reaction mixture in which it is employed, is low acidity. The level of acidity may be determined by acid-base titration in an organic medium, typically a mixture of a non-polar liquid such as toluene and a polar liquid such as an alkanol, with isopropanol often being preferred.

Acidity levels depend on such factors as the method of catalyst preparation and the purity of the polydiorganosiloxane. For example, TMDS may contain acid (ordinarily hydrochloric acid) in amounts on the order of 35–50 ppm. The reaction mixtures of the present invention contain titratable acid, if any, in an amount no greater than 0.5 equivalent per gram-atom of platinum, since if that value is exceeded catalyst activity decreases drastically. In most instances the acid level is much lower, preferably less than about 10 milliequivalents per gram-atom of platinum.

As explained hereinafter, a substantially higher level of acidity at a certain stage is sometimes preferred. This may be achieved by adding acid at the point when it is needed.

The method of this invention may be employed in several embodiments. In one embodiment, which may be employed with any value of x but which is frequently preferred when x is 1, contact between reagents A, B and C is effected at a temperature in the range of about 80°–150° C. and preferably about 80°–125° C. in the presence of a diluent. Inert diluents such as toluene or xylene may be used. The invention also includes employment of reaction product constituents, especially bis(aminoalkyl)polydiorganosiloxane, as diluent.

In this embodiment it is possible for all three reagents and the solvent to be initially present in the reaction vessel, but it is also within the scope of the invention to add part or all of reagents A and B to the combination of reagent C and the solvent. Reagent C may also be introduced incrementally or continuously so as to maintain a substantially constant reaction rate.

For maximum yield of bis(aminoalkyl)polydiorganosiloxane, the maximum percentage of combined reagents A and B in a solution in an inert diluent should be at most about 40% and preferably about 10–25% by weight when all reagents are initially present. When reagents A and B, and optionally part of reagent C, are subsequently added to such a solution, final concentrations up to about 85% and especially about 65% are acceptable. When reaction product constituents are employed as diluent, final concentrations may be up to 100%.

The mole ratio of A to B should be at least about 2:1 and preferably about 2.2–2.5:1, the reaction time should be about 1–6 hours and the pressure should be atmospheric. The proportion of catalyst (reagent C) is not critical but is generally about 5–150 and preferably about 5–100 ppm. of platinum by weight based on the total of reagents A and B. An inert atmosphere, such as nitrogen, is preferred.

When this embodiment is employed, the major product is a bis(aminoalkyl)polydiorganosiloxane of the formula

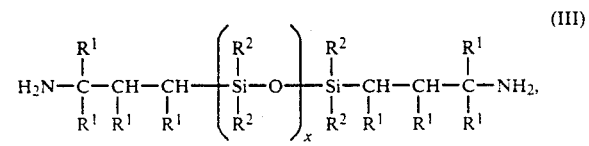

wherein $R^1$ and x are as previously defined. A by-product generally obtained in varying amounts, often relatively high when x is 1, is a cyclic disiloxazane having the formula

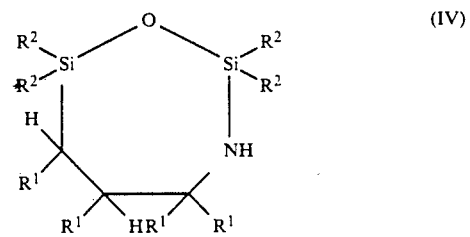

which may be converted to a bis(aminoalkyl)octaorganotetrasiloxane by hydrolysis as described hereinafter. Cyclic disiloxazanes having formula IV are another aspect of the invention.

Isolation of the bis(aminoalkyl)polysiloxane in this embodiment may be achieved by conventional distillation/solvent stripping operations. However, it is preferred to maintain the temperature of the mixture no higher than about 160° C. during stripping, to avoid formation of by-products which may interfere with product use.

At stripping temperatures, there is evidence for conversion of cyclic disiloxazane to oligomers wherein the structural units have the formula

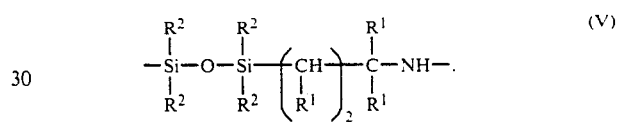

Such oligomers may be easily alcoholyzed to alkoxyaminoalkyltetraorganodisiloxanes of the formula

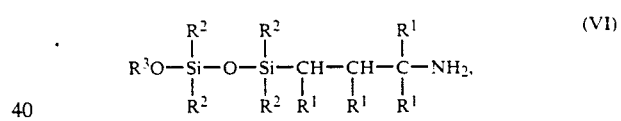

wherein $R^3$ is a $C_{1-4}$ alkyl radical and especially methyl. Upon hydrolysis of the alkoxyaminoalkylpolydiorganosiloxane, typically at temperatures in the range of about 80°–100° C. and preferably in the presence of a strong base and especially a tetraalkylammonium hydroxide as catalyst, the desired bis(aminoalkyl)polydiorganosiloxanes are obtained. Alkoxyaminoalkylpolydiorganosiloxanes of formula VI are another aspect of the invention.

A second embodiment is similar to the first except that no diluent is employed and reagent B is a compound in which x is at least 2. The product is then a bis(aminoalkyl)polydiorganosiloxane of formula III wherein x is greater than 1. In other respects, the proportions and reaction conditions for this embodiment are similar to those described for the first, except that the process is not as sensitive to the halogen content of the catalyst.

In a third embodiment, employed when x is 1, contact between reagents A, B and C (reagent C generally being employed in the above-described proportions) is effected in a system free from extraneous diluents, at a temperature initially in the range of about 30°–75° C. and in an inert atmosphere. The principal initial (amination) product is then an alkenylaminodisiloxane having the formula

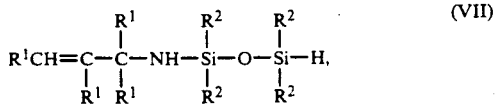

(VII)

formed with the evolution of hydrogen. Compounds of formula VII are still another aspect of the invention; they may be isolated by conventional means after poisoning of the catalyst with a sulfur compound such as thiophenol.

Upon continued contact with the catalyst, the alkenylaminodisiloxanes of formula VII undergo intramolecular hydrosilation to form cyclic disiloxazanes of formula IV. The cyclization reaction is very exothermic; when molar ratios of reagent A to reagent B on the order of 1:1 are employed, the reaction may be initiated at temperatures as low as 20° C. and very efficient cooling may be necessary to prevent it from getting out of control. It is generally preferred to employ reagent A in excess, typically in a molar ratio to reagent B of about 2–4:1. The reaction then proceeds smoothly at temperatures in the range of about 60°–110° C. and may often be conveniently conducted at reflux. Care must be taken, however, that reagent A not be lost by volatilization to the point where less than a 1:1 ratio remains in the reaction vessel, since a vigorous or even uncontrollable reaction may result.

Under certain conditions, and especially when the reaction mixture is acid-free at this stage, the yield of the cyclic disiloxazane of formula IV decreases sharply. There is evidence for intermolecular hydrosilation thereof, forming polymers with units of formula V, under these conditions.

It has been discovered, however, that the polymer-forming reaction is easily reversed by maintaining the reaction mixture acidic at this stage. This is conveniently achieved by utilizing a hydrosilation catalyst which contains strong acid (in the previously described minor amounts) or by adding a strong acid to the reaction mixture after hydrosilation. Both Bronsted and Lewis acids are suitable, and the identity thereof is not particularly critical so long as it is sufficiently strong.

Illustrative acids are mineral acids such as hydrochloric acid, acidic salts such as ammonium sulfate, organic acids such as p-toluenesulfonic acid and Lewis acids such as dimethylchlorosilane. Only very small proportions thereof are necessary, the amounts present in the catalyst as previously described being sufficient provided said catalyst contains titratable acid. However, it is also within the scope of the invention to add a strong acid to the reaction mixture in greater amounts, typically up to about 300 milliequivalents per gram-atom of platinum. (For the purposes of this invention, the equivalent weight of the acid is its molecular weight divided by the number of strongly acidic centers therein. Thus, hydrochloric acid, p-toluenesulfonic acid, ammonium sulfate and dimethylchlorosilane are all considered monobasic acids.)

According to the aforementioned U.S. Pat. No. 4,649,208, the platinum-catalyzed hydrosilation of allylamine requires the presence of an amino compound other than the allylamine. In the present invention, no other amino compound is necessary and the employment of such an amino compound, although not harmful, usually offers no advantage. Therefore, in a preferred embodiment of the invention reagent A is the only amine present.

The cyclic disiloxazanes of formula IV are convertible by hydrolysis to bis(aminoalkyl)octaorganotetrasiloxanes; that is, compounds of formula III wherein x is 3. Hydrolysis is conveniently effected by merely contacting the cyclic disiloxazane with an excess of water at a temperature in the range of about 25–120° C., typically at reflux. In general, a molar ratio of water to cyclic disiloxazane on the order of about 2–4:1 is convenient.

The final products obtained by the above-described embodiments of the invention are various isomeric bis-(aminoalkyl)polydiorganosiloxanes. For example, allylamine is converted principally to the bis(3-aminopropyl) compounds, with varying proportions of 1-methyl-2-aminoethyl species. For most purposes, the presence of such isomers is acceptable.

As previously mentioned, the bis(aminoalkyl)polydiorganosiloxanes are useful for the preparation of polysiloxane polyetherimides. For this purpose, compounds of formula III wherein x has an average value in the range of about 10–15 are generally preferred. They may be prepared from lower molecular weight compounds by equilibration with a cyclic polydiorganosiloxane such as octamethylcyclotetrasiloxane under basic conditions. The bis(aminoalkyl)tetraorganodisiloxanes and bis(aminoalkyl)octaorganotetrasiloxanes are among the compounds which may be used for this purpose, and by employing suitable proportions of reactants it is possible to convert both of these species to bis(aminoalkyl)-polydiorganosiloxanes having substantially the same average molecular weight. Therefore, the tetrasiloxanes are essentially equivalent to the corresponding disiloxanes from the standpoint of utility.

The invention is illustrated by the following examples. Unless otherwise indicated, the catalyst employed in these examples was a platinum complex of 1,3,5,7-tetravinyl-1,3,5,7-tetramethylcyclotetrasiloxane having a platinum content on the order of 1.5–2.0% by weight. It contained about 20–200 ppm. of chloride (0.006–0.062 gram-atom per gram-atom of platinum) and up to about 20 ppm. (6.1 meq. per gram-atom of platinum) of hydrochloric acid. Catalyst proportions are expressed in terms of parts by weight of platinum per million parts of reagents A and B combined. Said proportions are approximations, but the use of such approximations is permissible since the amount of catalyst is not a crucial feature of the invention.

EXAMPLE 1

To a 13.5% solution in o-xylene of allylamine and TMDS in a molar ratio of 2.5:1 was added catalyst in the amount of 40 ppm. The mixture was heated in a nitrogen atmosphere under reflux (128° C.) for 3 hours, after which analysis by silicon-29 nuclear magnetic resonance spectroscopy showed the product to consist entirely of 1,9-diamino-4,4,6,6-tetramethyl-5-oxa-4,6-disilanonane; no 2,2,7,7-tetramethyl-1-oxa-3-aza-2,7-disilacycloheptane (the compound of formula IV wherein $R^1$ is hydrogen and $R^2$ is methyl) was detected. The bis(aminoalkyl)disiloxane could be isolated by vacuum stripping of the xylene.

EXAMPLE 2

The procedure of Example 1 was repeated, varying the reaction temperature, reaction time and reactant concentration. The results are given in Table I, with 1,9-diamino-4,4,6,6-tetramethyl-5-oxa-4,6-disilanonane being identified as "linear" and 2,2,7,7-tetramethyl-1-oxa-3-aza-2,7-disilaheptane being identified as "cyclic".

TABLE I

| Temperature, °C. | Time, hrs. | Reactant conc., % | Percent yield Linear | Percent yield Cyclic |
|---|---|---|---|---|
| 123 | 1-¼ | 20 | 95.7 | 4.3 |
| 122 | 2 | 22 | 88.8 | 11.2 |
| 123 | 3-¾ | 23 | 85.4 | 14.6 |
| 126 | 5-¼ | 25 | 84.1 | 15.9 |
| 118 | 5-¼ | 30 | 79.2 | 20.8 |
| 140 | 1-½ | 23 | 77.9 | 22.1 |

EXAMPLE 3

To a vessel containing 1000 parts by weight of toluene and 20 ppm. of catalyst were added under reflux over 10 hours in a nitrogen atmosphere, with stirring, 816.5 parts of allylamine, 952.6 parts of TMDS and an additional 80 ppm. of catalyst. Methanol, 226.8 parts, was added with stirring and the mixture was stripped at 140° C., first at atmospheric and then under reduced pressure, after which crude product was distilled up to 140° C./10 torr. An excess of water was added to the distillate which was then stripped at 160° C., to yield the desired product comprising principally 1,9-diamino-4,4,6,6-tetramethyl-5-oxa-4,6-disilanonane in 92% yield.

EXAMPLE 4

A mixture of 71 parts by weight of 1,9-diamino-4,4,6,6-tetramethyl-5-oxa-4,6-disilanonane and 40 ppm. of catalyst is heated to 115° C. in a nitrogen atmosphere, and a mixture of 32.5 parts of allylamine and 67.5 parts of TMDS (0.57 mole each) is added dropwise over 6 hours, whereby a temperature in the range of 95°–110° C. is maintained. The mixture is cooled and analyzed by infrared spectroscopy and gas chromatography, showing the absence of Si—H bonds and the presence of the disilanonane and the corresponding cyclic disiloxazane. The crude product is distilled at 40°–100° C./0.5 torr and hydrolyzed by addition of 50 parts of water, whereupon an exotherm carries the temperature to 85° C. Upon removal of water by distillation, the desired product is obtained in 97% yield.

EXAMPLE 5

A mixture of 18.75 grams (328 mmol.) of allylamine, 93.34 grams (67 mmol.) of a polydiorganosiloxane of formula II wherein $R^2$ was methyl and x had an average value of about 23, 290.4 mg. (50 ppm.) of catalyst and 448 grams of o-xylene was heated to reflux in a nitrogen atmosphere over a period of 100 minutes, whereupon infrared spectroscopic analysis showed the reaction to be complete. Upon distillation of the solvent, there was obtained a bis(aminoalkyl)polydimethylsiloxane which was shown by carbon-13 and silicon-29 nuclear magnetic resonance spectroscopy and acid titration to have formula III wherein x is about 30. The apparent increase in chain length is believed to be the result of the presence of cyclic polydimethylsiloxanes in both reactant and product, which may affect the analyses differently in the two environments.

EXAMPLE 6

A mixture of 101.6 parts (1.78 moles) of allylamine, 148.4 parts (0.71 mole) of hexamethyltrisiloxane (the compound of formula II wherein each $R^2$ is methyl and x is 2) and catalyst in the amount of 50 ppm. of platinum was heated in a nitrogen atmosphere by means of an oil bath maintained at 85° C., with stirring. After about 15 minutes, an exothermic reaction occurred which caused a substantial temperature increase. After about 1½ hours the mixture had stopped refluxing, and the oil bath temperature was increased to 100° C. Heating was continued for a total of 4 hours.

Unreacted allylamine was removed by distillation at temperatures up to 140° C., and removal thereof was completed at reduced pressure. The mixture was then distilled under reduced pressure to yield the desired 1,11-diamino-4,4,6,6,8,8-hexamethyl-5,7-dioxa-4,6,8-trisilaundecane in at least 95% yield. The identity of the product was confirmed by elemental and spectroscopic analysis.

EXAMPLE 7

The procedure of Example 6 was repeated except that the catalyst employed therein was replaced by an equivalent amount of an anhydrous solution in octyl alcohol of chloroplatinic acid. After a reaction period of 24 hours, the yield of product (as identified by vapor phase chromatography) was 89%.

EXAMPLE 8

A mixture of 114.2 grams (2 moles) of allylamine, 134.3 grams (1 mole) of TMDS, 100 mg. of pyridine and catalyst in the amount of 40 ppm. of platinum was heated in a nitrogen atmosphere under reflux for 11 hours, during which time the pot temperature rose from 55° C. to 161° C. The product was distilled under vacuum at 45° C./1 torr, yielding 180 grams (95% of theoretical) of 2,2,7,7-tetramethyl-1-oxa-3-aza-2,7-disilacycloheptane. The product was identified by silicon-29 and carbon-13 nuclear magnetic resonance spectroscopy and mass spectroscopy.

A mixture of the cyclic disiloxazane and 8.57 grams of water was heated under reflux, with stirring, whereupon it turned cloudy and then clear. The product was shown by gas chromatographic analysis to be the desired 1,13-diamino-4,4,6,6,8,8,10,10-octamethyl-5,7,9-trioxa-4,6, 8,10-tetrasilatridecane.

EXAMPLE 9

A mixture of allylamine and tetramethyldisiloxane identical to that of Example 8 was prepared in a nitrogen atmosphere, and catalyst in the amount of 40 ppm. was added. Hydrogen gas evolution began immediately and lasted for about 35 minutes, after which the reaction mixture was brought to reflux at 54° C. Over the next 6 hours the temperature rose steadily to 74° C.; upon analysis by gas chromatography and infrared and mass spectroscopy the only product identified was 5,5,7,7-tetramethyl-4-aza-6-oxa-5,7-disila-1-heptene.

Heating was continued for an additional 6 hours with a rise in pot temperature to a final value of 105° C. Upon analysis, it was found that the alkenylaminodisiloxane had been converted entirely to cyclic disiloxazane, which was isolated by vacuum distillation. The yield was 200 grams, or 53% of theoretical.

EXAMPLE 10

Allylamine and TMDS in a 2:1 molar ratio were combined with about 8 ppm. of catalyst and the mixture was stirred overnight in a nitrogen atmosphere at room temperature, after which five drops of thiophenol was added to poison the catalyst. Unreacted starting materials were removed by vacuum stripping and the desired alkenylaminodisiloxane was recovered by vacuum distillation at 45° C./0.5 torr. Its structure was confirmed by silicon-29 and carbon-13 nuclear magnetic resonance spectroscopy and mass spectroscopy.

EXAMPLE 11

Allylamine and TMDS in a 1:1 molar ratio were combined with 40 ppm. of catalyst in a nitrogen atmosphere, whereupon hydrogen evolution was immediately observed. The mixture was heated to reflux and the pot temperature rose from 43° to 73° C. over 65 minutes; an exothermic reaction then occurred which caused an immediate rise to 155° C. The mixture was cooled to 45° C. and distilled under vacuum, yielding a very small proportion of cyclic disiloxazane. The distillation residue was steam distilled and shown to be a mixture of bis(3-aminopropyl)polydimethylsiloxanes.

EXAMPLE 12

To a mixture of 1262.6 grams (22.11 moles) of allylamine and 742.6 grams (5.53 moles) of TMDS was added in a nitrogen atmosphere, with stirring, 40 ppm. of catalyst, whereupon the temperature of the mixture rose from 21° to 28° C. and hydrogen evolution began. When hydrogen evolution slowed, the mixture was heated under reflux for 8 hours, whereupon the temperature rose to 65° C. Analysis by gas chromatography showed that all the TMDS had been converted to cyclic disiloxazane.

The excess allylamine was distilled under atmospheric pressure and then under vacuum, after which the cyclic disiloxazane was removed by distillation. Ammonium sulfate, 200 mg., was added to the residue and distillation was continued. The total yield of cyclic disiloxazane was 95% of theoretical.

EXAMPLE 13

The procedure of Example 9 was repeated, using catalysts with various degrees of acidity (HCl) and basicity (KOH). The results are given in Table II.

TABLE II

| Acid or (base) conc. | | Cyclic |
|---|---|---|
| Ppm. based on catalyst | Meq. per gram-atom Pt | % yield |
| (7) | (1.4) | 59 |
| (5) | (1.0) | 90.8 |
| 3 | 0.9 | 94.9 |
| 3 | 0.9 | 99.6 |

These results show that even a very small proportion of acid in the catalyst is effective to convert oligomer back to cyclic disiloxazane.

EXAMPLE 14

Experiments were conducted in which the procedure of Example 9 was repeated, except that various acids were added when hydrosilation was complete as shown by infrared spectroscopic analysis. The results are given in Table III.

TABLE III

| Acid | | Cyclic |
|---|---|---|
| Identity | Meq. per gram-atom Pt | % yield |
| None | — | 59 |
| p-Toluenesulfonic acid | 141.9 | 93.4 |

TABLE III-continued

| Acid | | Cyclic |
|---|---|---|
| Identity | Meq. per gram-atom Pt | % yield |
| Ammonium sulfate | 7.3 | 95.2 |
| Dimethylchlorosilane | 258 | 76.5 |

EXAMPLE 15

Various experiments were conducted using the procedure of Example 13, but employing TMDS containing various proportions of hydrochloric acid. The effect on catalyst activity, reaction time and temperature are given in Table IV.

TABLE IV

| | HCl concentration | | | | |
|---|---|---|---|---|---|
| Run | Ppm. | Equivs. per gram-atom Pt | Catalyst activity | Max temp., °C. | Reaction time, min. |
| 1 | 34.4 | 2.70 | Slight | 66 | 510 |
| 2 | 8.8 | 0.71 | Poor | 67 | 480 |
| 3 | 4.6 | 0.38 | Fair | 107 | 282 |
| 4 | 1.7 | 0.14 | Good | 115 | 205 |
| 5 | 0.7 | 0.05 | Good | 116 | 175 |
| 6 | 0 | 0 | Good | 120 | 146 |

It will be seen that the maximum reaction temperature increases steadily with a decrease in acid concentration. This is a result of improved conversion of TMDS to alkenylaminodisiloxane, which in turn is exothermically converted to cyclic disiloxazane. Catalyst activity also increases and reaction time decreases with a decrease in acid concentration.

What is claimed is:

1. A method for preparing a silicon-nitrogen which comprises effecting reaction between the components of a mixture comprising
(A) at least one olefinic amine of the formula

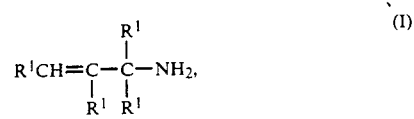

wherein each $R^1$ is independently hydrogen, $C_{1-4}$ primary or secondary alkyl, phenyl or substituted phenyl, and
(B) at least one polydiorganosiloxane of the formula

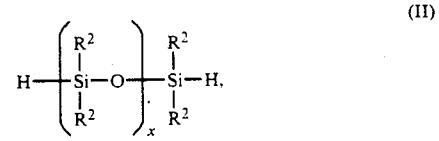

wherein $R^2$ is $C_{1-4}$ primary or secondary alkyl, phenyl or substituted phenyl and x has an average value from 1 to about 300, in the presence of a catalytic amount of
(C) a platinum-containing hydrosilation catalyst;
said mixture containing titratable acid, if any, in an amount up to 0.5 equivalent per gram-atom of platinum.

2. A method according to claim 1 wherein reagent C is a platinum complex of 1,3,5,7-tetravinyl-1,3,5,7-tetramethylcyclotetrasiloxane containing halogen, if any, in an amount no greater than 1 gram-atom per gram-atom of platinum.

3. A method according to claim 2 wherein the reaction is conducted in an inert atmosphere.

4. A method according to claim 3 wherein reagent A is the only amine present.

5. A method according to claim 4 wherein the proportion of catalyst is about 5–150 ppm. of platinum by weight based on the total of reagents A and B.

6. A method according to claim 5 wherein the reaction is conducted at a temperature in the range of about 80°–125° C.

7. A method according to claim 6 wherein x is 1, a diluent is employed and the product is a bis(aminoalkyl)-tetraorganodisiloxane.

8. A method according to claim 7 wherein reagent C contains halogen, if any, in an amount less than about 0.1 gram-atom per gram-atom of platinum.

9. A method according to claim 8 wherein each $R^1$ is hydrogen and each $R^2$ is methyl.

10. A method according to claim 9 wherein reagents A and B and a portion of reagent C are added incrementally or continuously to diluent and remaining reagent C, the mole ratio of A to B is about 2.2–2.5:1 and the reaction pressure is atmospheric.

11. A method according to claim 10 wherein the diluent is toluene or xylene.

12. A method according to claim 11 wherein the final concentration of combined reagents A and B in the solution is up to about 85% by weight.

13. A method according to claim 6 wherein x is greater than 1, contact between reagents A, B and C is effected in a system free from diluents and the product is a bis(aminoalkyl)polydiorganosiloxane.

14. A method according to claim 13 wherein reagent C contains halogen, if any, in an amount less than about 0.1 gram-atom per gram-atom of platinum.

15. A method according to claim 14 wherein each $R^1$ is hydrogen and each $R^2$ is methyl.

16. A method according to claim 15 wherein the mole ratio of A to B is about 2.2–2.5:1 and the reaction pressure is atmospheric.

17. A method according to claim 5 wherein x is 1 and contact between reagents A, B and C is effected in a system free from extraneous diluents and at a temperature initially in the range of about 30–75° C., to afford a product initially comprising an alkenylaminodisilazane of the formula

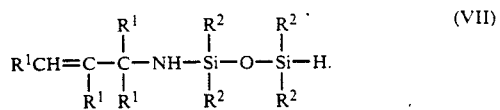

18. A method according to claim 17 wherein reagent C contains halogen, if any, in an amount less than about 0.1 gram-atom per gram-atom of platinum.

19. A method according to claim 18 wherein said product undergoes intramolecular hydrosilation to form a cyclic disiloxazane of the formula

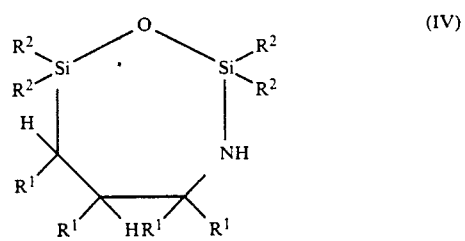

20. A method according to claim 19 wherein each $R^1$ is hydrogen and each $R^2$ is methyl.

21. A method according to claim 20 wherein the molar ratio of reagent A to reagent B is about 2–4:1.

22. A method according to claim 21 wherein the mixture contains titratable acid in an amount less than about 10 milliequivalents per gram-atom of platinum.

23. A method according to claim 22 wherein the product is subsequently hydrolyzed to a bis(aminoalkyl)octaorganotetrasiloxane by contact with an excess of water at a temperature in the range of about 25°–120° C.

24. An alkenylaminodisiloxane having the formula

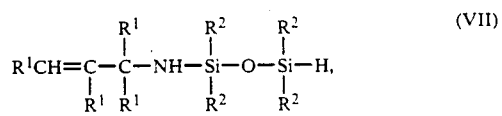

wherein each $R^1$ is independently hydrogen, $C_{1-4}$ primary or secondary alkyl, phenyl or substituted phenyl and $R^2$ is $C_{1-4}$ primary or secondary alkyl, phenyl or substituted phenyl.

25. An alkenylaminodisiloxane according to claim 24 wherein each $R^1$ is hydrogen and $R^2$ is methyl.

26. A cyclic disiloxazane having the formula

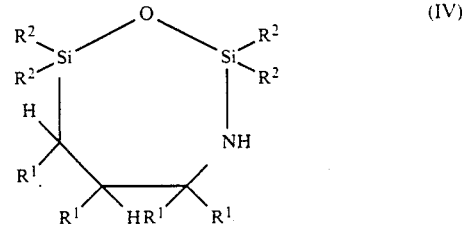

wherein each $R^1$ is independently hydrogen, $C_{1-4}$ primary or secondary alkyl, phenyl or substituted phenyl and $R^2$ is $C_{1-4}$ primary or secondary alkyl, phenyl or substituted phenyl.

27. A cyclic disiloxazane according to claim 26 wherein each $R^1$ is hydrogen and $R^2$ is methyl.

28. An alkoxyaminoalkyltetraorganodisiloxane having the formula

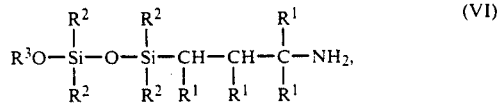

wherein each $R^1$ is independently hydrogen, $C_{1-4}$ primary or secondary alkyl, phenyl or substituted phenyl; $R^2$ is $C_{1-4}$ primary or secondary alkyl, phenyl or substituted phenyl; and $R^3$ is $C_{1-4}$ alkyl.

29. An alkoxyaminoalkyltetraorganodisiloxane according to claim 28 wherein each R is hydrogen, each $R^2$ is methyl and $R^3$ is methyl.

* * * * *